United States Patent [19]

Tracy

[11] Patent Number: 4,501,351

[45] Date of Patent: Feb. 26, 1985

[54] CHAIN ASSEMBLY WITH PLUG-IN MODULE

[75] Inventor: Wayne R. Tracy, Chicopee, Mass.

[73] Assignee: Incom International, Inc., Pittsburg, Pa.

[21] Appl. No.: 341,364

[22] Filed: Jan. 21, 1982

[51] Int. Cl.³ .............................................. B65G 25/00
[52] U.S. Cl. .................................... 198/648; 198/651
[58] Field of Search ............... 198/648, 651, 712, 731, 198/779; 474/226, 224, 270, 231

[56] References Cited

U.S. PATENT DOCUMENTS 3,912,072  10/1975  Koraylak .......................... 198/729

FOREIGN PATENT DOCUMENTS 595943   2/1978  Fed. Rep. of Germany ...... 198/651
969730  12/1950  France .............................. 198/731

Primary Examiner—Joseph E. Valenza
Assistant Examiner—Dennis Williamson
Attorney, Agent, or Firm—James C. Wray

[57] ABSTRACT

A chain assembly for easy removal and replacement of a module for supporting and carrying objects along a path parallel to chain movement. The chain has a pin link with a hollow pin adjacent an extended pin. A module having cylindrical shaft and perpendicular plate is inserted into the hollow pin so that a hole in the plate fits over the extended pin. The module is secured to the chain by insertion of a cotter pin into a hole at the end of the extended pin.

19 Claims, 3 Drawing Figures

CHAIN ASSEMBLY WITH PLUG-IN MODULE

BACKGROUND OF THE INVENTION

This invention relates generally to chains and more particularly to chain assemblies having replaceable plug-in modules.

Pertinent United States and foreign patents are found in Class 59, subclasses 78.1 and 93, and in Class 198, subclasses 648, 651 and 652 of the Official Classifications of Patents in the United States Patent and Trademark Office.

Examples of pertinent patents are U.S. Pat. Nos. 1,707,088; 4,129,206; 3,344,904; 3,365,158 and 3,915,288.

U.S. Pat. No. 1,707,088 shows an article support pin attached through a chain link and riveted in place on the chain. U.S. Pat. No. 4,129,206 shows a pin having a rotatable sleeve attached to the pin by a socket means. When damaged, the sleeve is easily removed and replaced while the pin remains attached to the chain.

U.S. Pat. Nos. 3,344,904 and 3,365,158 show pins, each having a shoulder which abuts the outer surface of the chain and a reduced, threaded portion which extends through to the inner surface of the chain. A nut is threaded onto the reduced portion of the pin to secure the pin to the chain. U.S. Pat. No. 3,915,288 shows a sleeve similar to those of U.S. Pat. Nos. 3,344,904 and 3,365,158.

U.S. Pat. Nos. 2,565,593; 788,542; 3,166,103; 3,086,641; 3,206,0041 3,206,0051 3,770,1071 3,387,829 and 3,625,338 are also pertinent to the state of the art in attaching pins to chain link systems.

Chains with extended pins or other attachments are known in the art. However, frequently, the extended pins or other attachments are damaged while in use. It is therefore highly desirable that the extended pins or attachments be quickly and easily removable and replaceable. Previous chain assemblies have proven unsatisfactory in this regard because they require disconnection of the chain to remove the attachments.

SUMMARY OF THE INVENTION

The present invention overcomes many of the problems which exist in the prior art devices.

Roller chains are made up of interconnected alternating pin links and roller links.

The chain assembly of the present invention includes a pin link having a hollow pin for receiving the plug-in module. The hollow pin is connected to a unique roller link. The pin adjacent to the hollow pin extends through its pin plate, and part of the plug-in module slips over the extended pin. To hold the module on the chain, a cotter pin is inserted in a hole in the end of the extended pin. All links in the chain remain connected during removal or replacement of the module.

Objects of the invention are, therefore, to provide an improved chain assembly and to provide a chain assembly having a plug-in module that can be easily removed without disconnecting the chain.

Another object of the invention is to provide a chain assembly having a plug-in module that can be easily replaced without disconnecting the chain.

Another object of the invention is to provide a chain assembly having a plug-in module that can be easily replaced with a module having different dimensions or characteristics without disconnecting the chain.

Another object of the invention is to provide a chain assembly having a plug-in module that can be easily repaired without disconnecting the chain.

Another object of the invention is to provide a chain assembly which can be used with or without the plug-in module.

Yet another object of the invention is to provide a chain assembly having a plurality of adjacent roller links joined together by a plurality of pin links, each pin link having a first pin plate rigidly attached to first and second pins for insertion through separate adjacent roller links and each pin link also having a second pin plate for securing adjacent roller links onto said pins while allowing movement of said roller links in the plane perpendicular to the pins, wherein at least one of the pin links has hollow first pin.

Yet another object of the invention is to provide a plug-in module easily inserted into or removed from a chain without disconnecting chain links including a pintle for insertion into the chain, a module pin plate attached to said cylindrical pintle for securing the pintle into the chain and carrying means attached to said pin plate for supporting objects and for carrying objects along a path parallel to chain movement.

These and other and further objects and features of the invention are apparent in the disclosure which includes the above and below specification and claims and drawings.

DETAILED DESCRIPTION OF THE DRAWINGS

Figure 1:
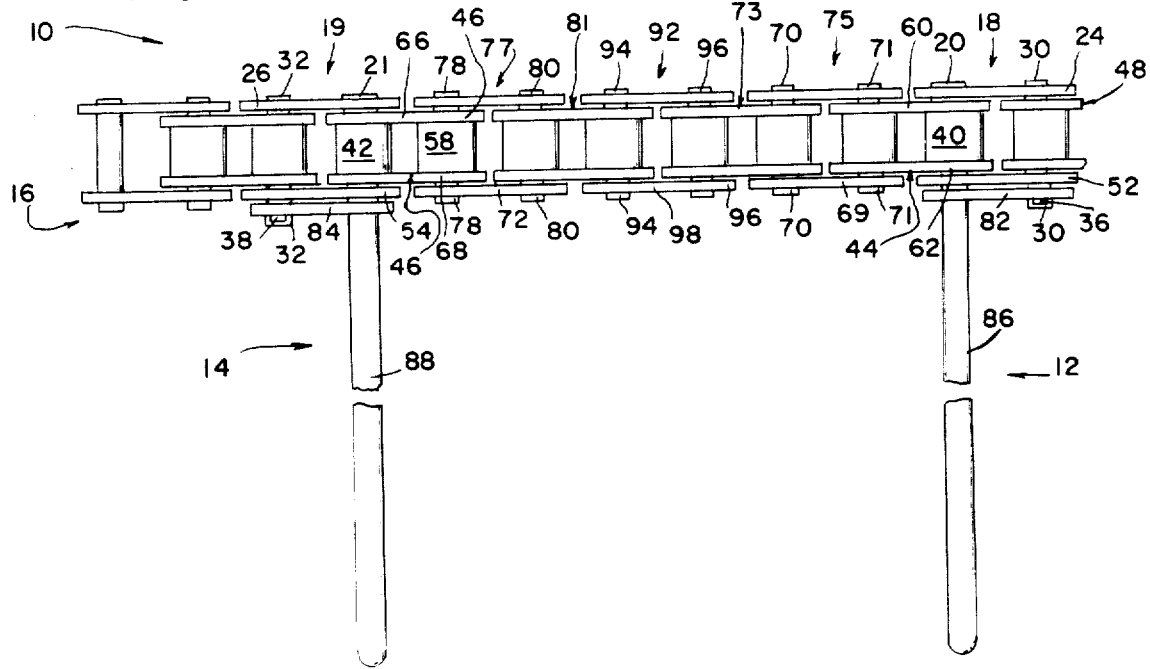
FIG. 1 is a top plan view of a chain assembly with plug-in module embodying the features of the present invention.
Figure 2:
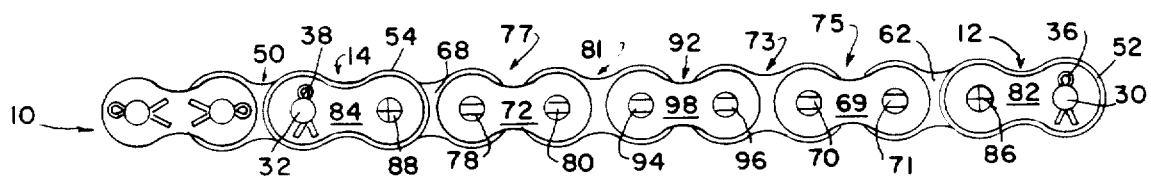
FIG. 2 is a side elevational view of the chain assembly shown in FIG. 1.
Figure 3:
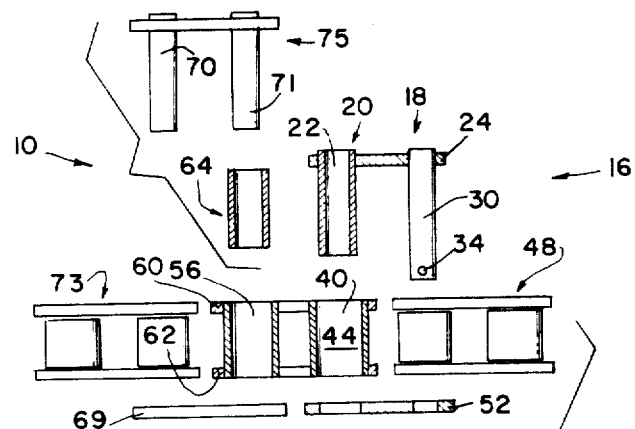
FIG. 3 is a top plan view of a portion of the chain assembly shown in FIG. 1, exploded and partially sectioned.

Referring to FIGS. 1, 2 and 3, the chain assembly with plug-in module is generally indicated by the numeral 10.

The chain assembly 10 has plug-in modules 12 and 14 and chain 16. Pin links 18 and 19 have hollow pins 20 and 21 being press-fit or otherwise rigidly attached to pin links 24 and 26. Hollow pin 20 has hollow portion 22 for insertion of pintle 28 of plug-in module 12. Pin links 18 and 19 also have extended pins 30 and 32 riveted or otherwise rigidly attached to pin links 18 and 19. Extended pin 30 has a small hole 34 in its end protruding through chain 16 for receiving cotter pin 36. Extended pin 32 also has a small hole in its end protruding through chain 16 for receiving cotter pin 38. Hollow pins 20 and 21 of pin links 18 and 19 are inserted through bushings 40 and 42 of roller links 44 and 46. Extended pins 30 and 32 of the pin links 18 and 19 are inserted through the roller links 48 and 50. Pin plates 52 and 54 are pressed or otherwise attached to the pin links 18 and 19. Pin plate 52 is attached to the pin link 18 securing the roller link 48 onto the extended pin 30 and the roller link 44 onto the hollow pin 20. Pin plate 54 is attached to pin link 19 at its pins 21 and 32 securing the roller link 50 onto the extended pin 32 and the roller link 46 onto the hollow pin 21. Roller links 44, 48, 46 and 50, although secured to pin links 18 and 19, are free to move in the plane perpendicular to pins 20, 30, 21 and 32.

Roller links 44 and 46 have bushings 40, 42, 56 and 58 press-fit or otherwise attached to roller plates as 60 and 62 of roller link 44. In the preferred embodiment, these bushings 40, 42, 56 and 58 are shown to be wider in diameter than the bushings in roller links not secured to hollow pins. The extra width is needed to accept the wider hollow pins 20 and 21 which are designed with internal hollow area, shown as 22 in hollow pin 20, of diameter similar to the diameter of the pins so that pins in pin links could fit into hollow pins 20 and 21 of pin links 18 and 19. The invention is not limited to this embodiment but includes hollow pins having internal hollow area of any diameter. The roller link bushings are also not limited to the diameter shown in this embodiment but include any diameter which would receive the dimensions of the particular hollow pin. Further, the invention includes all variations of hollow pin diameter, internal hollow area and bushing diameter, even within the same chain assembly.

Floating bushing 64 is situated in a bushing 56 of the roller link 44. Roller link 46 has a similar floating bushing, not shown in the drawings, situated in its bushing 58. Floating bushings are described in U.S. Pat. No. 3,643,517. These floating bushings form collars to receive the pin links 75 and 77 inserted through the roller links 44 and 46 while facilitating movement of pin links only in the plane perpendicular to the pins. Pin plate 69 is riveted or otherwise rigidly attached to pins 70 and 71 of a pin link 75 thereby securing a roller link 44 onto its pin 71 with a floating bushing 64 situated around the pin 71 in bushing 56 and securing a roller link 73 onto its pin 70 while allowing the roller links 44 and 73 to move in the plane perpendicular to pins 70 and 71 of the pin link 75. Pin plate 72 is riveted or otherwise rigidly attached to pins 78 and 80 of the pin link 77 thereby securing a roller link 46 onto a pin 78 with a floating bushing (not shown) situated around the pin 78 in the bushing 58 and securing a roller link 81 onto the pin 80 while allowing the roller links 46 and 81 to move in the plane perpendicular to pins 78 and 80 of the pin link 77.

Plug-in modules 12 and 14 have pintles, shown as 28 for module 12 and not shown for module 14, module pin plates 82 and 84, each having holes shown as 90 in plate 82, and also having support means 86 and 88 extending away from the chain 16. While the preferred embodiment shows the support means and pintle as consisting of the same straight cylindrical rod, it is understood that the invention is not limited to this embodiment. The pintle may have smaller or larger diameter than the support bar or the support bar may extend from the module pin plate at an angle other than 90°. The support bar may also be forked, include several branches or may even become wider or narrower. It may be flat, have any other shape or have any other object attached for the purpose of supporting or carrying an object along a path parallel to the chain movement.

The chain is complete and can be used without any plug-in modules 12 and 14 attached. Notice that adjacent roller links 44 and 48 are secured to pin link 18 without need of pintle 28 of module 12. Similarly adjacent roller links 46 and 50 are secured to pin link 19 without need of the pintle of plug-in module 14.

FIGS. 1 and 2 show pin link 92 having two pins 94 and 96 and pin plate 98 holding a roller link 73 on its second pin 96 while allowing the roller links 81 and 73 to move in the plane perpendicular to the pins 94 and 96. It is understood that this chain configuration of connecting adjacent roller links using pin links is contained in the prior art and is not included as part of the claimed invention.

Plug-in module 12 is attached to the chain 16 by insertion of a pintle 28 into the hollow portion 22 of the hollow pin 20 of a pin link 18. During insertion of a pintle 28, the module pin plate hole 90 is situated to slip over an extended pin 30 of a pin link 18. The module 12 is secured by insertion of a cotter pin 36 into the hole 34 near the protruding end of extended pin 30.

Plug-in module 14 is attached to the chain 16 by insertion of its pintle into the hollow portion of the hollow pin 21 of a pin link 19. During insertion of the pintle, the module pin plate hole is situated to slip over extended pin 32 of pin link 19. The module 14 is secured by insertion of a cotter pin 38 into the hole near the protruding end of extended pin 32. The cotter pin 38 blocks removal of module 14 from chain 16 because the module pin plate hole is too small to fit around the cotter pin. Removal of the module is easily accomplished similar to removal of the module 12 discussed above with removal of the cotter pin 38.

It is understood that use of a cotter pin in the preferred embodiment to secure the plug-in modules 12 and 14 to the chain 16 is not a limitation. The invention includes any method of reversibly securing a pin to a plate. Examples of these methods include use of a nut to screw onto a threaded pin and use of a magnetic plate or pin.

While the invention has been described with reference to a specific embodiment, the exact nature and scope of the invention is defined in the following claims.

I claim:

1. A chain assembly having a plurality of adjacent roller links joined together by a plurality of pin links, each pin link having a first pin plate rigidly attached to first and second pins for insertion through separate adjacent roller links and each pin link having a second pin plate for securing adjacent roller links onto said pins while allowing movement of said roller links in the plane perpindicular to the pins, wherein at least one pin link has a hollow first pin, wherein said hollow first pin has larger diameter than said second pin, and a support means inserted in said hollow first pin for supporting objects and for carrying objects along a path parallel to chain assembly movement, the support means comprising a pintle for insertion into said hollow first pin, carrying means connected to said pintle for carrying objects and the support means further comprising a module pin plate rigidly attached to the pintle for securing said pintle to the at least one pin link having the hollow first pin.

2. A chain assembly as defined in claim 1, wherein said hollow first pin has hollow area of diameter approximately the same as the diameter of said second pin.

3. A chain assembly as defined in claim 1, wherein the roller link secured to said hollow first pin comprises:
 a first roller link plate;
 a first bushing with an end rigidly attached to the first roller link plate for receiving said hollow first pin;
 a second bushing with and end rigidly attached to the first roller link plate.

4. A chain assembly as defined in claim 3, wherein the second bushing has similar diameter as said first bushing.

5. A chain assembly as defined in claim 4, wherein the roller link secured to said hollow first pin further comprises:
 a floating bushing situated in said second bushing.

6. A chain assembly as defined in claim 3, wherein the roller link secured to said hollow first pin further comprises:
    a second roller link plate rigidly attached to the first and second bushings near bushing ends opposite first roller link plate.

7. A chain assembly as defined in claim 1 or 6 wherein said second pin is longer than said first pin to extend beyond the pin plate.

8. A chain assembly as defined in claim 7 further comprising:
    a support means inserted in said hollow first pin for supporting objects and for carrying objects along path parallel to chain movement.

9. A chain assembly as defined in claim 8 wherein said support means comprises:
    a pintle for insertion into said hollow first pin;
    carrying means connected to said pintle for carrying objects.

10. A chain assembly as defined in claim 9 wherein said support means further comprises:
    a module pin plate rigidly attached to the pintle for securing said pintle into the hollow first pin.

11. A chain assembly as defined in claim 10 wherein said carrying means comprises a cylindrical rod.

12. A chain assembly as defined in claim 11, wherein the module pin plate has a hole situated to slip over said extended second pin when the pintle is inserted into said hollow first pin.

13. A chain assembly as defined in claim 12, further comprising:
    connecting means for reversibly securing the module pin plate onto the extended second pin.

14. A chain assembly as defined in claim 13, wherein said extended second pin has hole perpendicular to said second pin near protruding end, said connecting means comprising:
    a cotter pin inserted in the hole in the extended second pin for securing the module pin plate on said second pin.

15. A chain assembly as defined in claim 1 wherein said carrying means comprises a cylindrical rod.

16. A roller chain having at least one link adjacent pin links in a chain, said at least one link comprising:
    a first link plate having a plurality of holes;
    a second link plate having a plurality of holes;
    a plurality of bushings rigidly attached at opposite ends to the first and second link plates severally at the holes of the link plates;
    at least one of the bushings comprising a large bushing having a diamater larger than diameters of other bushings in the chain;
    at least one pin adjacent the large bushing having a length longer than pins in adjacent pin links, said pin extending laterally from the chain and means on an extended end of the pin for securing a carrier to the chain, and a carrier having a plate with an opening for receiving the extended pin and having a carrier pintle extending outward from the plate laterally of the chain and having means to secure the plate and the carrier pintle to prevent rotation with respect to the chain.

17. A roller link as defined in claim 16, wherein said first link plate and said second link plate are parallel to each other and perpendicular to said plurality of bushings.

18. A roller link as defined in claim 17, further comprising:
    at least one floating bushing situated in said plurality of bushings.

19. The roller chain of claim 16 wherein the chain comprises a hollow pin within the large bushing and wherein the pintle extends inward in the chain into the hollow pin.

* * * * *